(12) United States Patent
Qin et al.

(10) Patent No.: US 10,989,546 B2  
(45) Date of Patent: *Apr. 27, 2021

(54) METHOD AND DEVICE FOR PROVIDING VEHICLE NAVIGATION SIMULATION ENVIRONMENT

(71) Applicant: Beijing DiDi Infinity Technology and Development Co., Ltd., Beijing (CN)

(72) Inventors: Zhiwei Qin, San Jose, CA (US); Ishan Jindal, Detroit, MI (US); Xuewen Chen, Mountain View, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 311 days.

This patent is subject to a terminal disclaimer.

(21) Appl. No.: 15/970,414

(22) Filed: May 3, 2018

(65) Prior Publication Data
US 2019/0339086 A1 Nov. 7, 2019

(51) Int. Cl.
G01C 21/34 (2006.01)
G06Q 10/04 (2012.01)
G06Q 30/02 (2012.01)

(52) U.S. Cl.
CPC ....... G01C 21/3438 (2013.01); G01C 21/343 (2013.01); G01C 21/3453 (2013.01); G06Q 10/047 (2013.01); G06Q 30/0284 (2013.01)

(58) Field of Classification Search
CPC .............. G01C 21/3438; G01C 21/343; G01C 21/3453; G06Q 10/047; G06Q 30/0284
USPC .......................................................... 701/410
See application file for complete search history.

(56) References Cited

U.S. PATENT DOCUMENTS

2015/0339928 A1   11/2015  Ramanujam
2017/0365030 A1*  12/2017  Shoham ................. G06Q 10/02
2018/0211124 A1    7/2018  Rakah et al.

FOREIGN PATENT DOCUMENTS

EP       1538585 A1      6/2005

OTHER PUBLICATIONS

International Search Report and the Written Opinion dated Mar. 18, 2019, issued in International Application No. PCT/US2018/067859 (14 pages).

(Continued)

*Primary Examiner* — Maceeh Anwari
(74) *Attorney, Agent, or Firm* — Sheppard Mullin Richter & Hampton LLP

(57) ABSTRACT

A method may comprise recursively performing: (1) providing one or more states of a simulation environment to a simulated vehicle, and the states comprise a first current time and a first current location of the simulated vehicle; (2) obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, and the milestone is an origin or a destination of any passenger group's transportation; (3) determining a reward to the simulated vehicle for the action; and (4) updating the one or more states based on the action to obtain one or more updated states for providing to the simulated vehicle.

18 Claims, 9 Drawing Sheets

(56) References Cited

OTHER PUBLICATIONS

G. Brockman, V. Cheung, L. Pettersson, J. Schneider, J. Schulman, J. Tang, and W. Zaremba. Openai gym, 2016.
B. Hengst. "Hierarchical Reinforcement Learning", pp. 495-502. Springer US, Boston, MA, 2010.
I. Jindal, Tony, Qin, X. Chen, M. Nokleby, and J. Ye. A Unified Neural Network Approach for Estimating Travel Time and Distance for a Taxi Trip. ArXiv e-prints, Oct. 2017.

* cited by examiner

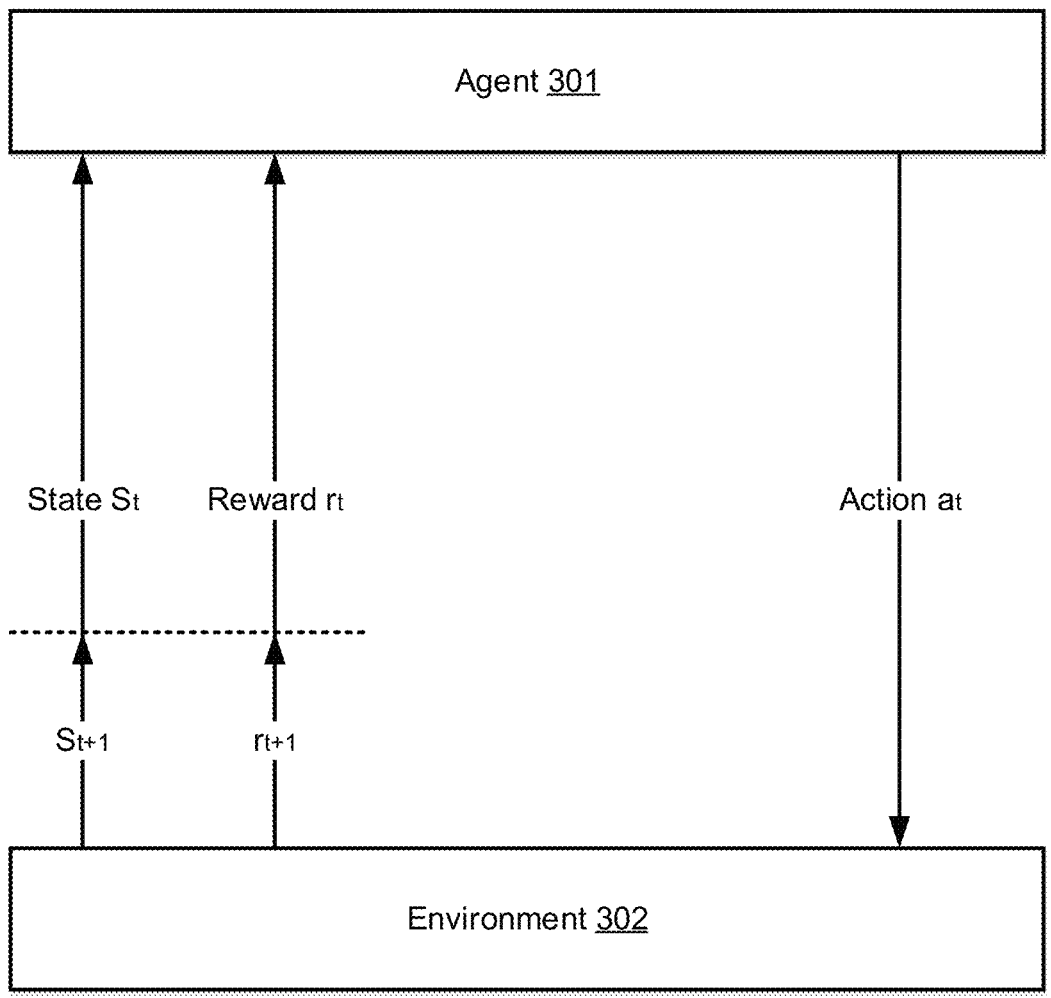
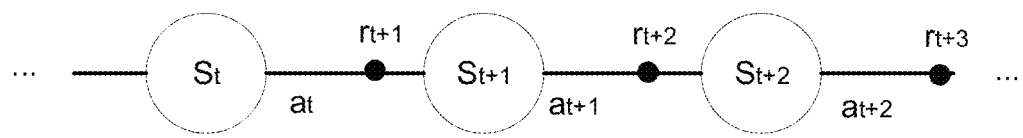
FIG. 3A

Algorithm 1

1: $S \leftarrow D_0, M \leftarrow \{\}, n \leftarrow 0$

2: *while simulation not terminated*

3:     *If* $K - k > 0$ :

4:         *select one of the following cases:*

5:             *case* 1: *wait* (*when* $k = 0$) *See Algorithm* 1

6:             *case* 2: *pickup*

7:                 $k \leftarrow k + 1$

8:                 $(O_k, D_k) \leftarrow Seletct\ Pickup\ (S, D)$

9:                 $S \leftarrow O_k$

10:                $M \leftarrow M + (O_k, D_k)$

11:            *case* 3: *drop off*

12:                $k \leftarrow k - 1$

13:                $k' \leftarrow Seletct\ Dropoff\ (S, M)$

14:                $S \leftarrow D_{k'},\ M \leftarrow M \backslash (O_{k'}, D_{k'})$ 15:     *Else:* (*Dropoff*)

16:         $k \leftarrow k - 1$

17:         $k' \leftarrow Seletct\ Dropoff\ (S, M)$

18:         $S \leftarrow D_{k'},\ M \leftarrow M \backslash (O_{k'}, D_{k'})$

19:     $n \leftarrow n + 1$

13:     *If* $n > N$:    *simulation terminates*

FIG. 3B

Algorithm 2 Wait Action

1: procedure
2: *Given: $\mathcal{D}, l_0, t_0, t_d, T = 600$ Sec., $T_c$*
3:     $S_0 \leftarrow (l_0, t_0)$
4:     $S_1 \leftarrow (l_0, t_0 + t_d), r \leftarrow 0$

FIG. 3C

Algorithm 3 *Extra Travel Time: ETT($\mathcal{D}, O_1, D_1$)*

1: procedure
2: $\forall O_2, D_2 \in \mathcal{D}$
3:     $\text{Ext}_I(O_1, D_1) \leftarrow t(O_1, O_2) + t_{\text{Est}}(O_2, D_1) - t(O_1, D_1)$
4:     $\text{Ext}_I(O_2, D_2) \leftarrow t_{\text{Est}}(O_2, D_1) + t_{\text{Est}}(D_1, D_2) - t(O_2, D_2)$
5:     $\text{Ext}_{II}(O_1, D_1) \leftarrow t(O_1, O_2) + t(O_2, D_2) + t_{\text{Est}}(O_2, D_1) - t(O_1, D_1)$
6:     $\text{Ext}_{II}(O_2, D_2) \leftarrow t(O_2, D_2) - t(O_2, D_2)$
7:     $\text{Total}_{\text{Ext}_I} \leftarrow \text{Ext}_I(O_1, D_1) + \text{Ext}_I(O_2, D_2)$
8:     $\text{Total}_{\text{Ext}_{II}} \leftarrow \text{Ext}_{II}(O_1, D_1) + \text{Ext}_{II}(O_2, D_2)$
    return $\text{Total}_{\text{Ext}_I}, \text{Total}_{\text{Ext}_{II}}$

FIG. 3D

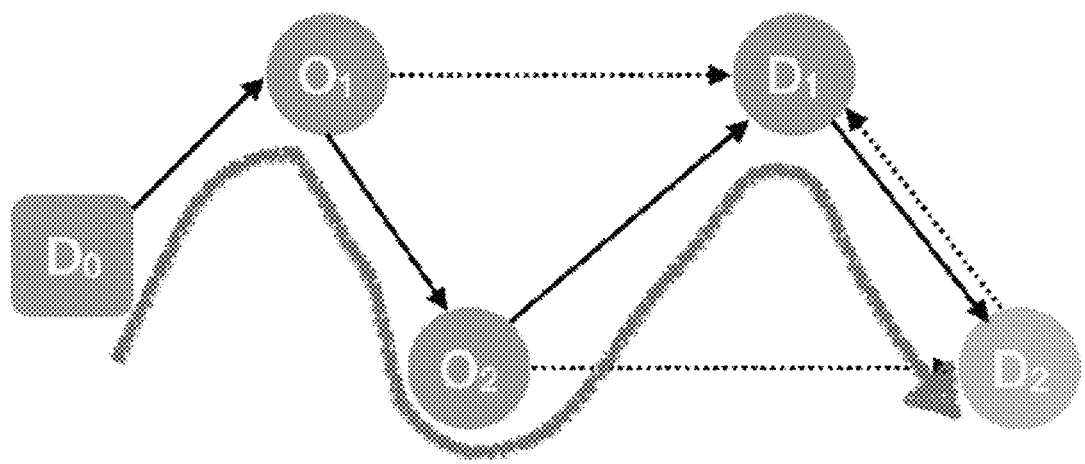
$O_1$ is dropped first; *Path I*
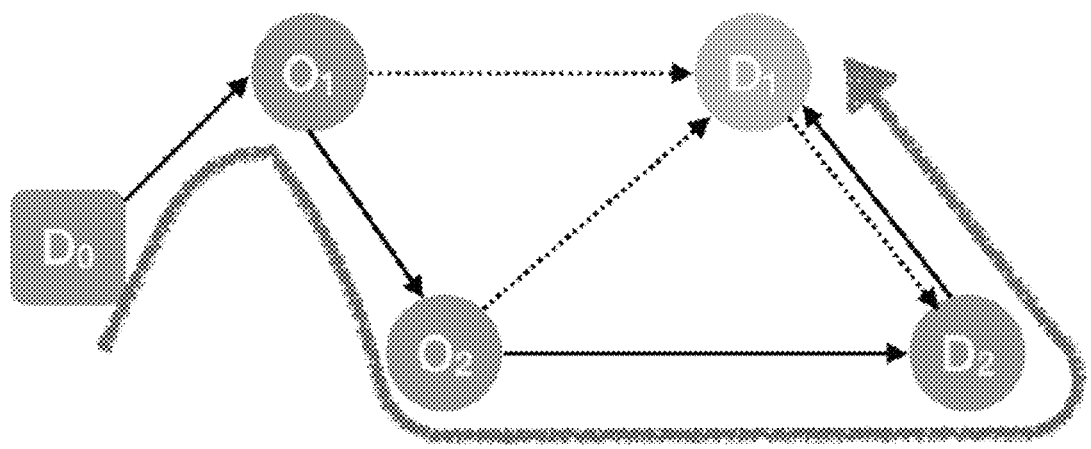
$O_2$ is dropped first; *Path II*
FIG. 3E

400

401: (1) providing one or more states of a simulation environment to a simulated agent, wherein: the simulated agent comprises a simulated vehicle, and the states comprise a first current time and a first current location of the simulated vehicle

402: (2) obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, the passenger groups A and B each comprise one or more passengers, and the milestone is an origin or a destination of any passenger group's transportation

403: (3) determining a reward to the simulated vehicle for the action

404: (4) updating the one or more states based on the action to obtain one or more updated states for providing to the simulated vehicle, wherein: the updated states comprise a second current time and a second current location of the simulated vehicle

┌─────────────────────────────────────────────────┐
│ 451: determining a current location a real vehicle │
└─────────────────────────────────────────────────┘
                              │
                              ▼
┌─────────────────────────────────────────────────┐
│ 452: in response to determining that the real vehicle has reached a milestone, the milestone being an origin or a destination of any passenger group's transportation, providing an instruction based at least on a trained policy that maximizes a cumulative reward for the real vehicle │
└─────────────────────────────────────────────────┘

FIG. 4B

METHOD AND DEVICE FOR PROVIDING VEHICLE NAVIGATION SIMULATION ENVIRONMENT

FIELD OF THE INVENTION

This disclosure generally relates to methods and devices for providing vehicle navigation simulation environment and providing vehicle navigation.

BACKGROUND

A vehicle dispatch platform can automatically allocate transportation requests to corresponding vehicles for providing transportation services. The transportation service can include transporting a single passenger/passenger group or carpooling multiple passengers/passenger groups. Each vehicle driver provides and is rewarded for the transportation service provided. For the vehicle drivers, it is important to maximize their rewards for their time spent on the streets.

SUMMARY

Various embodiments of the present disclosure can include systems, methods, and non-transitory computer readable media configured to provide a vehicle navigation simulation environment. According to one aspect, an exemplary method for providing vehicle navigation simulation environment may comprise recursively performing steps (1)-(4) for a time period: (1) providing one or more states of a simulation environment to a simulated agent, wherein: the simulated agent comprises a simulated vehicle, and the states comprise a first current time and a first current location of the simulated vehicle; (2) obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, the passenger groups A and B each comprise one or more passengers, and the milestone is an origin or a destination of any passenger group's transportation; (3) determining a reward to the simulated vehicle for the action; and (4) updating the one or more states based on the action to obtain one or more updated states for providing to the simulated vehicle, wherein the updated states comprise a second current time and a second current location of the simulated vehicle.

According to another aspect, the present disclosure provides a non-transitory computer-readable storage medium storing instructions that, when executed by one or more processors, cause the one or more processors to perform a method for providing vehicle navigation simulation environment. The method may comprise recursively performing the above-described steps (1)-(4) for a time period.

According to another aspect, the present disclosure provides a method for providing vehicle navigation. The method may comprise: determining a current location a real vehicle; and in response to determining that the real vehicle has reached a milestone, the milestone being an origin or a destination of any passenger group's transportation, providing an instruction based at least on a trained policy that maximizes a cumulative reward for the real vehicle. The provided instruction comprises: waiting at the current location, picking up a passenger group A at an origin of passenger group A's transportation, or dropping off a passenger group B at a destination of passenger group B's transportation. The passenger groups A and B each comprise one or more passengers. The instruction of picking up the passenger group A at the origin of passenger group A's transportation comprises, when the real vehicle has a first passenger group onboard, picking up a second passenger group. Transporting the first and second passenger groups takes the least sum of: a total extra passenger travel time for (routing option 1) and a total extra passenger travel time for (routing option 2). The (routing option 1) comprises picking up the second passenger group, then dropping of the passenger group P, and then dropping of the second passenger group. The (routing option 2) comprises picking up the second passenger group, then dropping of the second passenger group, and then dropping of the first passenger group. The total extra passenger travel time for the (routing option 1) is a summation of extra time costing the first and second passenger groups when transported by the simulated vehicle following the (routing option 1) as compared to being transported one-group-by-one-group without carpool. The total extra passenger travel time for the (routing option 2) is a summation of extra time costing the first and second passenger groups when transported by the simulated vehicle following the (routing option 2) as compared to being transported one-group-by-one-group without carpool.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3A illustrates an exemplary reinforcement learning framework, in accordance with various embodiments.

FIGS. 3B-3D illustrate exemplary algorithms for providing vehicle navigation simulation environment, in accordance with various embodiments.

FIG. 3E illustrates exemplary routing options for carpooling, in accordance with various embodiments.

FIG. 4A illustrates a flowchart of an exemplary method for providing vehicle navigation simulation environment, in accordance with various embodiments.

FIG. 4B illustrates a flowchart of an exemplary method for providing vehicle navigation, in accordance with various embodiments.

DETAILED DESCRIPTION

Vehicle platforms may be provided for transportation services. Such vehicle platform may also be referred to as a vehicle hailing or vehicle dispatching platform, accessible through devices such as mobile phones installed with a platform application. Via the application, users (transportation requestors) can transmit transportation requests (e.g., a pick-up location, a destination) to the vehicle platform. The vehicle platform may relay the requests to vehicle drivers. The vehicle drivers can choose from the requests to accept, pick up and drop off the passengers according to the accepted requests, and be rewarded accordingly. Each transportation request may include an indication whether the passenger group is open to carpool. Sometimes, two or more passengers/passenger groups open to carpool may share the same vehicle ride for a certain travel distance.

Existing platforms merely provide basic information of current transportation requests, by which drivers are unable to determine a best strategy (e.g., who to pick up for, whether to accept carpool) for maximizing their earnings. Or if the platform automatically matches vehicles with service requestors, the matching is only based on simple conditions such as closest in distance. Further, with current technologies, drivers are neither able to determine the best route when carpooling passengers. Therefore, to help drivers maximize their earnings and/or help passengers minimize their trip time, it is important for the vehicle platform to provide automatic decision-making functions that can revamp the vehicle service.

Various embodiments of the present disclosure include systems, methods, and non-transitory computer readable media configured to provide vehicle navigation simulation environment, as well as systems, methods, and non-transitory computer readable media configured to provide vehicle navigation. The provided vehicle navigation simulation environment may comprise a simulator for training a policy that helps maximize vehicle driver rewards and/or minimize passenger trip time. The provided vehicle navigation may be based on the trained policy to guide real vehicle drivers in real situations.

The disclosed systems and methods provide algorithms for constructing a vehicle navigation environment (also referred to as a simulator) for training an algorithm or a model based on historical data (e.g., various historical trips and rewards with respect to time and location). From the training, the algorithm or the model may provide a trained policy. The trained policy may maximize the reward to the vehicle driver, minimize the time cost to the passengers, maximize the efficiency of the vehicle platform, maximize the efficiency of the vehicle service, and/or optimize other parameters according to the training. The trained policy can be deployed on servers for the platform and/or on computing devices used by the drivers.

Figure 1:
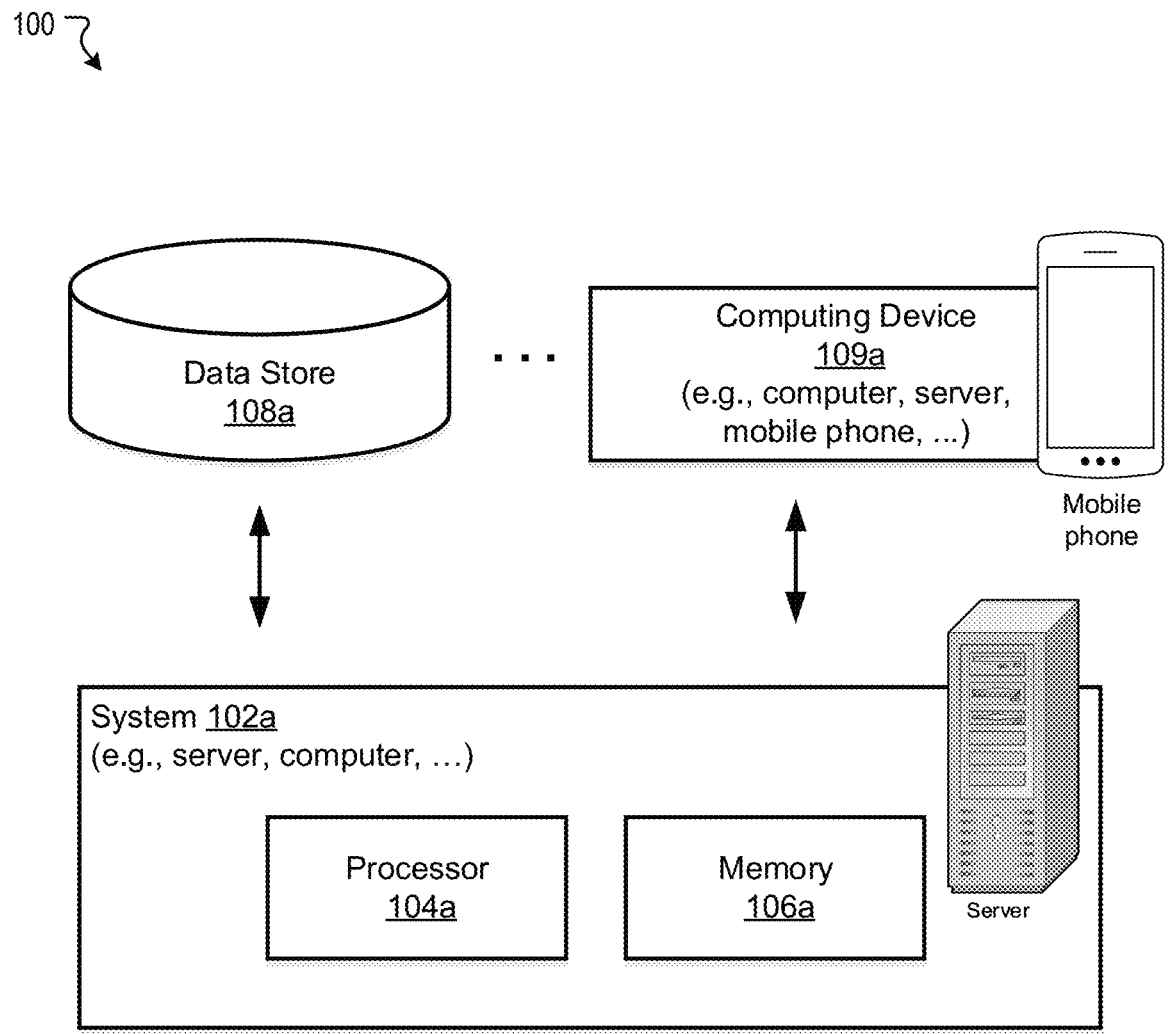
FIG. 1 illustrates an exemplary environment for providing vehicle navigation simulation environment, in accordance with various embodiments.

FIG. 1 illustrates an exemplary environment 100 for providing vehicle navigation simulation environment, in accordance with various embodiments. As shown in FIG. 1, the example environment 100 can comprise at least one computing system 102a that includes one or more processors 104a and memory 106a. The processor 104a may comprise a CPU (central processing unit), a GPU (graphics processing unit), and/or an alternative processor or integrated circuit. The memory 106a may be non-transitory and computer-readable. The memory 106a may store instructions that, when executed by the one or more processors 104a, cause the one or more processors 104a to perform various operations described herein. The system 102a may be implemented on or as various devices such as server, computer, etc. The system 102a may be installed with appropriate software and/or hardware (e.g., wires, wireless connections, etc.) to access other devices of the environment 100. In some embodiments, the vehicle navigation environment/simulator disclosed herein may be stored in the memory 106a as algorithms.

The environment 100 may include one or more data stores (e.g., data store 108a) and one or more computing devices (e.g., computing device 109a) that are accessible to the system 102a. In some embodiments, the system 102a may be configured to obtain data (e.g., historical trip data) from the data store 108a (e.g., database or dataset of historical transportation trips) and/or the computing device 109a (e.g., computer, server, mobile phone used by driver or passenger that captures transportation trip information such as time, location, and fees). The system 102a may use the obtained data to train an algorithm or a model for vehicle navigation. The location may comprise GPS (Global Positioning System) coordinates of a vehicle.

Figure 2:
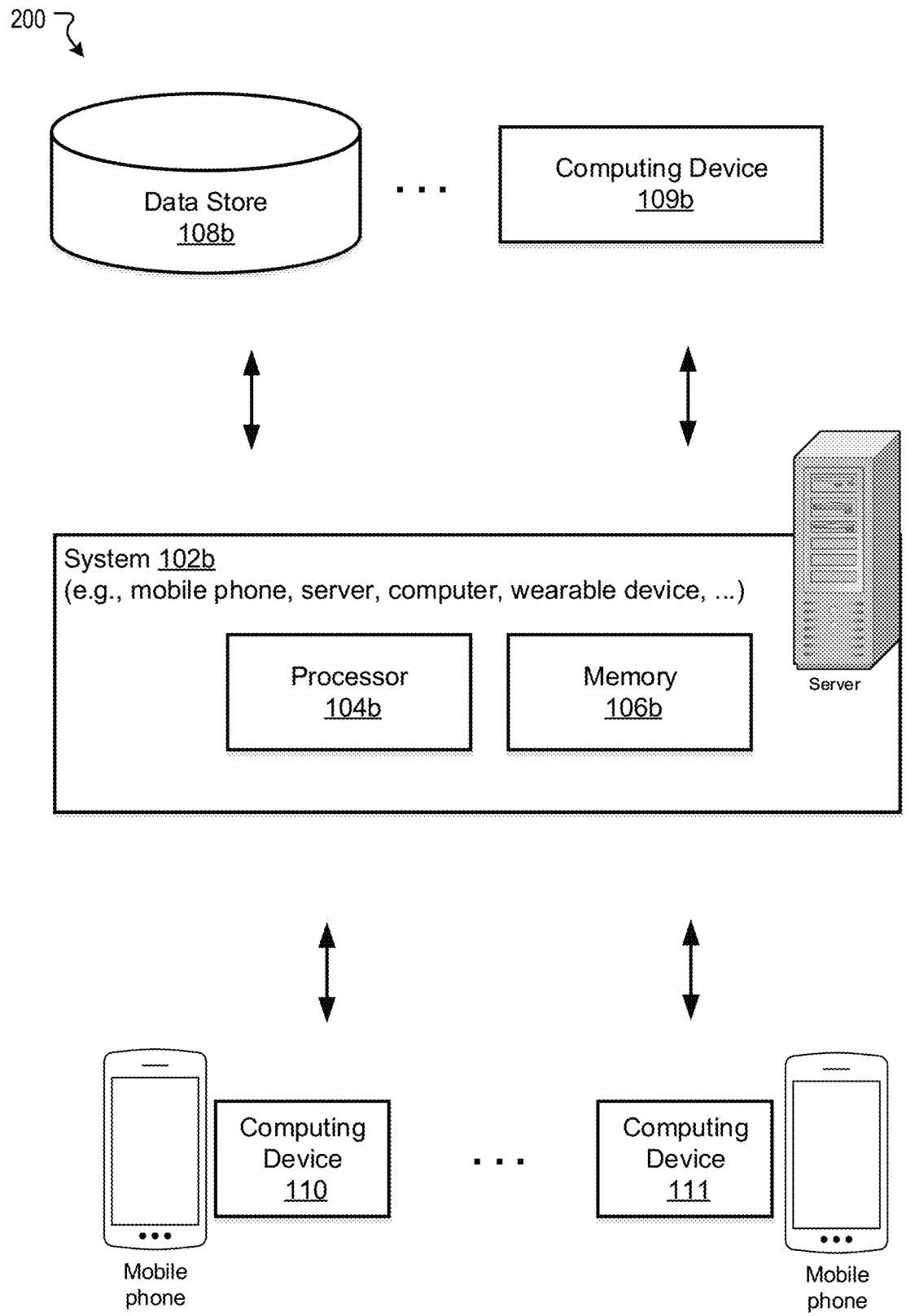
FIG. 2 illustrates an exemplary environment for providing vehicle navigation, in accordance with various embodiments.

FIG. 2 illustrates an exemplary environment 200 for providing vehicle navigation, in accordance with various embodiments. FIG. 2 illustrates an exemplary environment 200 for providing vehicle navigation simulation environment, in accordance with various embodiments. As shown in FIG. 2, the example environment 200 can comprise at least one computing system 102b that includes one or more processors 104b and memory 106b. The memory 106b may be non-transitory and computer-readable. The memory 106b may store instructions that, when executed by the one or more processors 104b, cause the one or more processors 104b to perform various operations described herein. The system 102b may be implemented on or as various devices such as mobile phone, server, computer, wearable device (smart watch), etc. The system 102b may be installed with appropriate software and/or hardware (e.g., wires, wireless connections, etc.) to access other devices of the environment 200.

The systems 102a and 102b may correspond to the same system or different systems. The processors 104a and 104b may correspond to the same processor or different processors. The memories 106a and 106b may correspond to the same memory or different memories. The data stores 108a and 108b may correspond to the same data store or different data stores. The computing devices 109a and 109b may correspond to the same computing device or different computing devices.

The environment 200 may include one or more data stores (e.g., a data store 108b) and one or more computing devices (e.g., a computing device 109b) that are accessible to the system 102b. In some embodiments, the system 102b may be configured to obtain data (e.g., map, location, current time, weather, traffic, driver information, user information, vehicle information, transaction information, etc.) from the data store 108b and/or the computing device 109b. The location may comprise GPS coordinates of a vehicle.

Although shown as single components in this figure, it is appreciated that the system 102b, the data store 108b, and the computing device 109b can be implemented as single devices or multiple devices coupled together, or two or more of them can be integrated together. The system 102b may be implemented as a single system or multiple systems coupled to each other. In general, the system 102b, the computing device 109b, the data store 108b, and the computing device 110 and 111 may be able to communicate with one another through one or more wired or wireless networks (e.g., the Internet) through which data can be communicated.

In some embodiments, the system 102b may implement an online information or service platform. The service may be associated with vehicles (e.g., cars, bikes, boats, airplanes, etc.), and the platform may be referred to as a vehicle (service hailing or ride order dispatching) platform. The platform may accept requests for transportation, identify vehicles to fulfill the requests, arrange for pick-ups, and process transactions. For example, a user may use the computing device 111 (e.g., a mobile phone installed with a software application associated with the platform) to request transportation from the platform. The system 102b may receive the request and relay it to various vehicle drivers (e.g., by posting the request to mobile phones carried by the drivers). One of the vehicle drivers may use the computing device 110 (e.g., another mobile phone installed with the application associated with the platform) to accept the posted transportation request and obtain pick-up location information. Similarly, carpool requests from multiple passengers/passenger groups can be processed. Fees (e.g., transportation fees) can be transacted among the system 102b and the computing devices 110 and 111. The driver can be compensated for the transportation service provided. Some platform data may be stored in the memory 106b or retrievable from the data store 108b and/or the computing devices 109b, 110, and 111.

The environment 100 may further include one or more computing devices (e.g., computing devices 110 and 111) coupled to the system 102b. The computing devices 110 and 111 may comprise devices such as cellphone, tablet, computer, wearable device (smart watch), etc. The computing devices 110 and 111 may transmit or receive data to or from the system 102b.

Referring to FIG. 1 and FIG. 2, in various embodiments, the environment 100 may train a model to obtain an policy, and the environment 200 may implement the trained policy. For example, the system 102a may obtain data (e.g., training data) from the data store 108 and/or the computing device 109. The training data may comprise historical trips taken by passengers/passenger groups. Each historical trip may comprise information such as pick-up location, pick-up time, drop-off location, drop-off time, fee, etc. The obtained data may be stored in the memory 106a. The system 102a may train a model with the obtained data or train an algorithm with the obtained data to learn a model for vehicle navigation. In the latter example, the algorithm of learning a model without providing a state transition probability model and/or a value function model may be referred to as a model-free reinforcement learning (RL) algorithm. By simulation, the RL algorithm may be trained to provide a policy that can be implemented in real devices to help drivers make optimal decisions.

FIG. 3A illustrates an exemplary reinforcement learning framework, in accordance with various embodiments. As shown in this figure, for an exemplary RL algorithm, a software agent 301 takes actions in an "environment" 302 (or referred to as "simulator") to maximize a "reward" for the agent. The agent and environment interact in discrete time steps. In training, at time step t, the agent observes the state of the system (e.g., state $S_t$), produces an action (e.g., action at), and gets a resulting reward (e.g., reward $r_{t+1}$) and a resulting next state (e.g., state $S_{t+1}$). Correspondingly, at time step t, the environment provides one or more states (e.g., state $S_t$) to the agent, obtains the action taken by the agent (e.g., action at), advances the state (e.g., state $S_{t+1}$), and determines the reward (e.g., reward $r_{t+1}$). Relating to the vehicle service context, the training may be comparable with simulating a vehicle driver's decision as to waiting at the current position, picking up a passenger group, or dropping off a passenger group (comparable to the agent's actions), with respect to time (comparable with the states), vehicle and customer location movements (comparable with the states), earnings (comparable with the reward), etc. Each passenger group may comprise one or more passengers. Waiting at the current location is only available when there is no passenger onboard. Picking up the certain passenger group is only available when the vehicle has not reached its maximum capacity (for carrying passengers). Dropping off the passenger group is only available when there is at least one passenger onboard.

Back to the simulation, to produce an optimal policy that governs the decision-making at each step, a corresponding state-action value function of the driver may be estimated. The value function can show how good a decision made at a particular location and time of the day with respect to the long-term objective (e.g., maximize earnings). At each step, with states provided by the environment, the agent executes an action (e.g., waiting, picking up a passenger group, dropping off a passenger group), and correspondingly from the environment, the agent receives a reward and updated states. That is, the agent chooses an action from a set of available actions, and the agent moves to a new state, and the reward associated with the transition is determined for the action. The transition may be recursively performed, and the goal of the agent is to collect as much reward as possible.

For the simulation, the RL algorithm builds on a Markov decision process (MDP). The MPD may depend on observable state space S, action space a, state transition probabilities, reward function r, starting state, and/or reward discount rate, some of which are described in details below. The state transition probabilities and/or reward function r may be known or unknown (referred to as model-free methods).

State, S: the states of a simulation environment may comprise location and/or time information. For example, the location information may comprise geo-coordinates of a simulated vehicle and time (e.g., time-of-day in seconds): S=(I, t), where I is the GPS coordinates pair (latitude, longitude), and t is time. S may contain additional features that characterize the spatio-temporal space (I, t).

Action, a: the action is assignment to the driver, the assignment may include: waiting at the current location, picking up a certain passenger/passenger group, and dropping off a certain passenger/passenger group. The assignment with respect to transportation may be defined by pick-up location(s), pick-up time point(s), drop-off location(s), and/or drop-off time point(s).

Reward, r: the reward may comprise various forms. For example, in simulation, the reward may be represented by a nominal number determined based on a distance. Determining the reward to the simulated vehicle for the action comprises: determining the reward to the simulated vehicle for waiting at the first current location of the simulated vehicle to be zero; determining the reward to the simulated vehicle for picking up the passenger group A at the origin of the passenger group A's transportation to be zero; and determining the reward to the simulated vehicle for dropping off the passenger group B at the destination of the passenger group B's transportation based on a theoretical travel distance from the origin of the passenger group B's transportation to the destination of the passenger group B's transportation. That is, the reward may be issued when the passenger group is dropped off and be determined based on a transportation distance between the passenger group's requested origin and destination as if the passenger group is transported alone by the vehicle (e.g., a theoretical distance for transporting the passenger group alone from her origin to her destination, without accounting for the detour for picking up or dropping off another passenger group). In real life, the reward may relate to a total fee for the transportation, such as the compensation received by the driver for each transportation. The platform may determine such compensation based on a distance traveled (e.g., the same theoretical travel distance) or other parameters.

Episode: the episode may comprise any time period such as one complete day from 0:00 am to 23:59 pm. Accordingly, a terminal state is a state with t component corresponding to 23:59 pm. Alternatively, other episode definitions for a time period can be used.

Policy, $\pi$: a function that maps a state to a distribution over the action space (e.g., stochastic policy) or a particular action (e.g., deterministic policy).

In various embodiments, the trained policy from RL beats existing decision-making data and other inferior policies in terms of the cumulative reward. The simulation environment can be trained with historical data of trips taken by historical passenger groups, such as a data set of historical taxi trips within a given city. The historical data can be used to bootstrap sample passenger trip requests for the simulation. For example, given one month of trips data, a possible way of generating a full day of trips for a simulation run is to sample one-fourth of the trips from each hour on the given day-of-week over the month. For another example, it can be assumed that after a driver drops off a passenger at her destination, and from the vicinity of the destination, the driver would be assigned a new trip request. According to action searches and/or route determinations described below, the action of a simulated vehicle can be selected by the given policy, which may comprise fee-generating trips, wait actions, etc. The simulation can be run for multiple episodes (e.g., days), and the cumulative reward gained can be computed and averaged over the episodes.

Detailed algorithms for providing the environment are provided below with reference to FIGS. 3B-3E. The environment can support various modes. In an On-demand Mode, transportation request(s) from passenger(s) do not have to be known to the simulated vehicle in advance. In agreement to the RL terminologies, the driver's (agent's) state which may comprise a (location, time) pair, the agent's action, and the reward collected after executing each action are tracked.

In some embodiments, an exemplary method for providing vehicle navigation simulation environment may comprise recursively performing steps (1)-(4) for a time period. The steps (1)-(4) may include: (1) providing one or more states of a simulation environment to a simulated agent, wherein: the simulated agent comprises a simulated vehicle, and the states comprise a first current time and a first current location of the simulated vehicle; (2) obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, the passenger groups A and B each comprise one or more passengers, and the milestone is an origin or a destination of any passenger group's transportation; (3) determining a reward to the simulated vehicle for the action; and (4) updating the one or more states based on the action to obtain one or more updated states for providing to the simulated vehicle, wherein the updated states comprise a second current time and a second current location of the simulated vehicle.

In some embodiments, the "passenger group" is to distinguish passengers that are picked up from different locations and/or dropped off at different locations. If passengers share the same pick-up and drop-off locations, they may belong to the same passenger group. Each passenger group may comprise just one passenger or multiple passengers. Further, the simulated vehicle may have a capacity for K passengers, and during at any time of the transportation, the number of total passengers on board may not exceed K. When referring to the passenger herein, the driver is not counted.

In some embodiments, in the On-demand Mode, the action of waiting at the current location, picking up at passenger group A, or dropping off a passenger group B is assigned to the simulated vehicle at each milestone. The agent can learn a policy to determine the best action at the each milestone. The various actions are described in details below with reference to respective algorithms. For the RL training, at the start of the episode, Do is the initial state $S_0=(I_0, t_0)$ of the vehicle, whereas the actual origin of a vehicle transportation trip is $O_1$, and $S_{O1}=(I_{O1}, t_{O1})$ is the intermediate state of the vehicle when picking up the first passenger. Such representations and similar terms are used in the algorithms below.

FIG. 3B illustrates an exemplary Algorithm 1 for providing vehicle navigation simulation environment, in accordance with various embodiments. The operations shown in FIG. 3B and presented below are intended to be illustrative.

In some embodiments, the simulated driver may make a wait/pick-up/drop-off decision at every trip milestone (at either $O_k$ or $D_k$, where k=0, 1, 2, . . . K, and K being the maximum passenger-carrying or passenger-group-carrying capacity of the vehicle). The decision may be made using the passenger requests data arising at that moment (for training and for real-life implementation). That is, the requests do not have to be known before the entire trip begins. The states of the simulate vehicle/driver before an action is taken may include a first current time and a first current location. The states of the simulate vehicle/driver after an action is taken may include a second current time and a second current location.

In some embodiments, the Algorithm 1 may comprise the following steps: given currently k passenger group onboard, if there is still at least one vacant seat available (see line 3 of Algorithm 1), the driver can execute one of the three actions:

(1) Wait (see line 5 of Algorithm 1): this action is only available when k=0, that is, no passenger onboard. Details steps of this action is described below with reference to Algorithm 2 in FIG. 3C. In some embodiments, to maximize the reward to the driver, the simulated vehicle performs the action of waiting at the first current location of the simulated vehicle only if the simulated vehicle has no passenger onboard. If the action is waiting at the current location of the simulated vehicle, the second current time is a current time corresponding to the first current time plus a time segment, and the second current location is the same as the first current location.

(2) Pick-up (see lines 6-10 of Algorithm 1): the vehicle goes to $O_{k+1}$ to pick up a passenger group A, and k←k+1. If the action is picking up the passenger group A at the origin of the passenger group A's transportation, the second current time is a current time corresponding to picking up the passenger group A and the second current location is the origin of the passenger group A's transportation.

(3) Drop-off (see lines 11-14 of Algorithm 1): the simulated driver determines the onboard passenger k' (also referred to as passenger group B) to drop off, using route planning similar to that described below with reference to FIG. 3D and FIG. 3E. The vehicle moves to $D_{k'}$, and k←k+1. In some embodiments, the simulated vehicle only performs the action of dropping off the passenger group B at the destination of passenger group B's when passengers onboard of the simulated vehicle meets a maximum capacity. That is, when k=K, only the drop-off action can be taken, and no wait action or pick-up action can be taken. If the action is dropping off the passenger group B at the destination of the passenger group B's transportation, the second current time is a current time corresponding to dropping off the passenger group B and the second current location is the destination of the passenger group B's transportation.

Each action may cause a state transition (change in vehicle location and/or time). If there is no seat available, the driver executes the drop-off action, same as above (see lines 15-18 of Algorithm 1).

Also in Algorithm 1 of FIG. 3B, S stores the current location of the vehicle and/or the current time, M is a memory buffer that stores the currently onboard passengers or passenger groups (e.g., in the form of origin-destination pairs), and N is the maximum steps desired for the simulation. M+(O, D) means a passenger group associated with origin O and destination D is added to the memory buff, and M\(O, D) means a passenger group associated with origin O and destination D is removed from the memory buff. The sub-procedures SelectPickUp( ) and SelectDropOff( ) can be configured to customarily for simulation or for real-life application. In some embodiments, SelectPickUp( ) takes as input the current location S and the set of outstanding orders D and returns the next passenger to pick up, and SelectDropOff( ) takes as input the current location S and onboard memory M and returns the next passenger to drop off. In a simple example, Select-PickUp( ) can pick up the nearest passenger order, and SelectDropOff( ) can drop off the passenger whose destination is closest to S. That is, the origin of passenger group A's transportation may be the closest to the first current location among all origins of all passenger group transportations received as requests by the simulated vehicle by the first current time, and the destination of the passenger group B's transportation may be the closest to the first current location among all destinations of all passenger groups onboard of the simulated vehicle at the first current time.

In some embodiments, the reward returned for each action transition is the effective trip distance—the trip distance for the original individual trip of that passenger being dropped off (e.g., the theoretical distance for transporting a passenger from her requested origin to her requested destination alone). Thus, determining the reward to the simulated vehicle for the action comprises: determining the reward to the simulated vehicle for waiting at the first current location of the simulated vehicle to be zero; determining the reward to the simulated vehicle for picking up the passenger group A at the origin of the passenger group A's transportation to be zero; and determining the reward to the simulated vehicle for dropping off the passenger group B at the destination of the passenger group B's transportation based on a theoretical travel distance from an origin of the passenger group B's transportation to the destination of the passenger group B's transportation.

FIG. 3C illustrates an exemplary Algorithm 2 for providing vehicle navigation simulation environment, in accordance with various embodiments. The operations shown in FIG. 3C and presented below are intended to be illustrative.

Algorithm 2 may correspond to a Wait Action (W). That is, M=0 and the simulated vehicle is assign to wait at its current location without picking up any passenger group. When the wait action is assigned to the vehicle at state $S_0 = (I_0, t_0)$, the vehicle stays at the current location $I_0$ while the time to advances by $t_d$. Therefore, the next state of the driver would be $(I_0, t_0 + t_d)$ (see line 4 of Algorithm 2). That is, if the action at the step (2) is waiting at the current location of the simulated vehicle, the second current time is a current time corresponding to the first current time plus a time segment $t_d$, and the second current location is the same as the first current location.

FIG. 3D illustrates an exemplary Algorithm 3 for providing vehicle navigation simulation environment, in accordance with various embodiments. The operations shown in FIG. 3D and presented below are intended to be illustrative.

In some embodiments, the trained policy may further determine an order of dropping passenger groups onboard of the real vehicle, if two or more passenger groups are onboard. As an example, it can be assumed that a first passenger group (requested to ride from an origin O1 to a destination D1) and a second passenger group (requested to ride from an origin O2 to a destination $D_2$) are onboard of the simulated vehicle. and determined choices for the second passenger group. Which of the first and second passenger groups to drop off first can be determined. In some embodiments, the action of picking up the passenger group A at the origin of passenger group A's transportation comprises, when the simulated vehicle has a first passenger group onboard, picking up a second passenger group. After having the first passenger group onboard, the simulated vehicle may receive multiple requests and may need to choose the second passenger group for carpooling with the first passenger group. The second passenger group can be determined based on having a minimum $(T_{ExtI} + T_{ExtII})$ under the current policy. $T_{ExtI}$ and $T_{ExtII}$ are discussed below with reference to relevant path options illustrated in FIG. 3E.

FIG. 3E illustrates exemplary routing options for carpooling, in accordance with various embodiments. The operations shown in FIG. 3E and presented below are intended to be illustrative. FIG. 3E shows two possible solutions to the routing problem. That is, after picking up a first passenger group (requested to ride from an origin O1 to a destination D1) and a second passenger groups (requested to ride from an origin O2 to a destination $D_2$) for carpool, the simulated vehicle can either follow:

$D_0 \to O_1 \to O_2 \to D_1 \to D_2$ shown as Path I in FIG. 3E, or $D_0 \to O_1 \to O_2 \to D_2 \to D_1$ shown as Path II in FIG. 3E.

In some embodiments, to determine the better path, an extra passenger travel time $Ext_P(x, y)$ traveled by a vehicle going from x to y when a path P is chosen can be defined. The extra travel time $Ext_P(. , .)$ is an estimation of extra time each passenger group would have spent during carpool which otherwise is zero if no carpool is taken. For instance, in FIG. 3E the actual travel time without carpool for the first passenger group picked up from O1 is $t(O_1, D_1)$ and for the second passenger group picked up from $O_2$ is $t(O_2, D_2)$ respectively. On the other hand, with carpool, the travel time for the first passenger group picked up from $O_1$ is $t(O_1,$ $O_2$)+$t_{Est}(O_2, D_1)$, and for the second passenger group picked up from $O_2$ is $t_{Est}(O_2, D_1)$+$t_{Est}(D_1, D_2)$. The estimated travel time $t_{Est}(.\,,.)$ can be the output of a prediction algorithm, an example of which is discussed in the following reference incorporated herein by reference in its entirety: I. Jindal, Tony, Qin, X. Chen, M. Nokleby, and J. Ye., A Unified Neural Network Approach for Estimating Travel Time and Distance for a Taxi Trip, ArXiv e-prints, October 2017.

Referring back to FIG. 3D, Algorithm 3 shows how to obtain the extra passenger travel time for Path I and Path II. The extra travel time for the first passenger group, when Path I is followed, is:

$$Ext_I(O_1,D_1)=t(O_1,O_2)+t_{Est}(O_2,D_1)-t(O_1,D_1)$$

The extra travel time for the second passenger group, when Path I is followed, is:

$$Ext_I(O_2,D_2)=t_{Est}(O_2,D_1)+t_{Est}(D_1,D_2)-t(O_2,D_2)$$

The extra travel time for the first passenger group, when Path II is followed, is:

$$Ext_{II}(O_1,D_1)=t(O_1,O_2)+t(O_2,D_2)+t_{Est}(O_2,D_1)-t(O_1,D_1)$$

The extra travel time for the second passenger group, when Path II is followed, is:

$$Ext_{II}(O_2,D_2)=t(O_2,D_2)-t(O_2,D_2)=0$$

From the individual extra travel time for the on-board passenger groups for both the paths, the total extra passenger travel time can be obtained for each path. That is, for Path I, $Total_{ExtI}=T_{ExtI}=Ext_I(O_1, D_1)+Ext_I(O_2, D_2)$. For Path II, $Total_{ExtII}=T_{ExtII}=Ext_{II}(O_1, D_1)+Ext_{II}(O_2, D_2)$. Thus, to minimize extra time cost to passengers, the simulated vehicle can choose Path I if $Total_{ExtI} < Total_{ExtII}$ and otherwise follow Path II. In either case, when the first passenger group has been dropped off, the corresponding reward of $d(O_1, D_1)$ can be issued, and when the second passenger group has been dropped off, the corresponding reward of $d(O_2, D_2)$ can be issued.

As discussed, the second passenger group can be determined based on having a minimum ($T_{ExtI}+T_{ExtII}$) under the current policy. That is, transporting the first and second passenger groups takes the least sum of: a total extra passenger travel time for (routing option 1) and a total extra passenger travel time for (routing option 2). The (routing option 1) comprises picking up the second passenger group, then dropping of the passenger group P, and then dropping of the second passenger group. The (routing option 2) comprises picking up the second passenger group, then dropping of the second passenger group, and then dropping of the first passenger group. The total extra passenger travel time for the (routing option 1) is a summation of extra time costing the first and second passenger groups when transported by the simulated vehicle following the (routing option 1) as compared to being transported one-group-by-one-group without carpool. The total extra passenger travel time for the (routing option 2) is a summation of extra time costing the first and second passenger groups when transported by the simulated vehicle following the (routing option 2) as compared to being transported one-group-by-one-group without carpool. In some embodiments, if the total extra passenger travel time for the (routing option 1) is less than the total extra passenger travel time for the (routing option 2), the simulated vehicle is assigned to follow the (routing option 1); and if the total extra passenger travel time for the (routing option 1) is more than the total extra passenger travel time for the (routing option 2), the simulated vehicle is assigned to follow the (routing option 2).

As such, the disclosed environment can be used to train models and/or algorithms for vehicle navigation. Existing technologies have not developed such systems and methods that can provide a robust mechanism for training policies for vehicle services. The environment is a key for providing optimized policies that can guide vehicle driver effortlessly while maximizing their gain and minimizing passenger time cost. Therefore, the provided simulation environment paves the way for generating automatic vehicle guidance that makes passenger-picking, dropping-off, and waiting decisions as well as carpool routing decisions for real vehicle drivers, which are unattainable by existing technologies.

FIG. 4A illustrates a flowchart of an exemplary method 400 for providing vehicle navigation simulation environment, according to various embodiments of the present disclosure. The exemplary method 400 may be implemented in various environments including, for example, the environment 100 of FIG. 1. The exemplary method 400 may be implemented by one or more components of the system 102a (e.g., the processor 104a, the memory 106a). The exemplary method 400 may be implemented by multiple systems similar to the system 102a. The operations of method 400 presented below are intended to be illustrative. Depending on the implementation, the exemplary method 400 may include additional, fewer, or alternative steps performed in various orders or in parallel.

The exemplary method 400 may comprise recursively performing steps (1)-(4) for a time period (e.g., a day). At block 401, step (1) may comprise providing one or more states of a simulation environment to a simulated agent. The simulated agent comprises a simulated vehicle, and the states comprise a first current time and a first current location of the simulated vehicle. At block 402, step (2) may comprise obtaining an action by the simulated vehicle when the simulated vehicle has reached a milestone. The action is selected from: waiting at the first current location of the simulated vehicle, picking up a passenger group A at an origin of passenger group A's transportation, and dropping off a passenger group B at a destination of passenger group B's transportation. The passenger groups A and B each comprise one or more passengers. The milestone is an origin or a destination of any passenger group's transportation. At block 403, step (3) may comprise determining a reward to the simulated vehicle for the action. At block 404, step (4) may comprise updating the one or more states based on the action to obtain one or more updated states for providing to the simulated vehicle. The updated states comprise a second current time and a second current location of the simulated vehicle.

In some embodiments, the exemplary method 400 may be executed to obtain a simulator/simulation environment for training an algorithm or a model as described above. For example, the training may intake historical trip data to obtain a policy that maximizes a cumulative reward over the time period. The historical data may include details of historical passenger trips such as historical time points and locations of pick-ups and drop-offs. That is, the recursive performance of the steps (1)-(4) based on historical data of trips taken by historical passenger groups trains a policy that maximizes a cumulative reward for the time period, and the trained policy determines an action for a real vehicle in a real environment, the action for the real vehicle in the real environment being selected from: (action 1) waiting at a current location of the real vehicle, (action 2) picking up a passenger group, and (action 3) dropping off a passenger group. The trained policy may further determine an order of dropping passenger groups onboard of the real vehicle, if two or more passenger groups are onboard.

Accordingly, the trained policy can be implemented on various computing devices to help service vehicle drivers to maximize their reward when they work on the streets. For example, a service vehicle driver may install a software application on a mobile phone and use the application to access the vehicle platform to receive business. The trained policy can be implemented in the application to recommend the driver to take a reward-optimizing action. For example, the trained policy as executed may provide a recommendation such as: (1) waiting at the current position, (2) determining and picking up a passenger group, or (3) determining and dropping off a passenger group. Each passenger group includes one or more passengers. The passenger groups to be picked up have already requested the transportations from the vehicle platform, and their requested pick-up locations are known to the application and the vehicle. The details for determining the recommendation are described below with reference to FIG. 4B.

FIG. 4B illustrates a flowchart of an exemplary method 450 for providing vehicle navigation, according to various embodiments of the present disclosure. The exemplary method 450 may be implemented in various environments including, for example, the environment 200 of FIG. 2. The exemplary method 450 may be implemented by one or more components of the system 102b (e.g., the processor 104b, the memory 106b) or the computing device 110. For example, the method 450 may be executed by a server to provide instructions to the computing device 110 (e.g., a mobile phone used by a vehicle driver). The method 450 may be implemented by multiple systems similar to the system 102b. For another example, the method 450 may be executed by the computing device 110. The operations of method 450 presented below are intended to be illustrative. Depending on the implementation, the exemplary method 450 may include additional, fewer, or alternative steps performed in various orders or in parallel.

At block 451, a current location of a real vehicle may be determined. In one example, this step may be triggered when a vehicle driver activates a corresponding function from an application. In another example, this step may be performed constantly by the application. The current location of the real vehicle may be determined based on a location-tracking-enabled device onboard of the vehicle (e.g., a vehicle-mounted GPS device, the vehicle driver's mobile phone). Since the mobile phone may have GPS tracking functions and the driver may use the application when operating the vehicle, the location of the mobile phone may be used as the location of the vehicle. At block 452, in response to determining that the real vehicle has reached a milestone, the milestone being an origin or a destination of any passenger group's transportation, an instruction based at least on a trained policy that maximizes a cumulative reward for the real vehicle may be provided. The training of the policy is described above with reference to FIG. 1, FIGS. 3A-3E, and FIG. 4A. The provided instruction comprises: waiting at the current location, picking up a passenger group A at an origin of passenger group A's transportation, or dropping off a passenger group B at a destination of passenger group B's transportation. The passenger groups A and B each comprise one or more passengers. The instruction of picking up the passenger group A at the origin of passenger group A's transportation comprises, when the real vehicle has a first passenger group onboard, picking up a second passenger group. Transporting the first and second passenger groups takes the least sum of: a total extra passenger travel time for (routing option 1) and a total extra passenger travel time for (routing option 2). The (routing option 1) comprises picking up the second passenger group, then dropping of the passenger group P, and then dropping of the second passenger group. The (routing option 2) comprises picking up the second passenger group, then dropping of the second passenger group, and then dropping of the first passenger group. The total extra passenger travel time for the (routing option 1) is a summation of extra time costing the first and second passenger groups when transported by the simulated vehicle following the (routing option 1) as compared to being transported one-group-by-one-group without carpool. The total extra passenger travel time for the (routing option 2) is a summation of extra time costing the first and second passenger groups when transported by the simulated vehicle following the (routing option 2) as compared to being transported one-group-by-one-group without carpool.

In some embodiments, if the total extra passenger travel time for the (routing option 1) is less than the total extra passenger travel time for the (routing option 2), the instruction may comprise following the (routing option 1). If the total extra passenger travel time for the (routing option 1) is more than the total extra passenger travel time for the (routing option 2), the instruction may comprise following the (routing option 2).

In some embodiments, the trained policy can determine, at the milestone, whether to wait at the current location, pick up a certain passenger group requesting transportation, or drop off a passenger group onboard, and provide such determination to the driver (e.g., via the driver's mobile phone). The application and the algorithm also keeps track of the current passengers onboard by monitoring the transportation tasks undertaken and subjects the determination to the following conditions. Waiting at the current location is only available when there is no passenger onboard. Picking up the certain passenger group is only available when the vehicle has not reached its maximum capacity (for carrying passengers). Dropping off the passenger group is only available when there is at least one passenger onboard. With the training, the trained policy may automatically determine which of the wait, pick-up, and drop-off actions to recommend based on maximizing the reward to the vehicle driver, minimizing the time cost to the passengers, maximizing the efficiency of the vehicle platform, maximizing the efficiency of the vehicle service, and/or optimizing other parameters according to the training. Further, the trained policy may automatically determine which the order of dropping off passenger groups, when there are multiple passenger group onboard.

Accordingly, the vehicle driver can rely on policy and/or algorithm determinations to perform the vehicle service in an efficient manner, with maximization of her gain and/or minimization of passengers' time costs. The vehicle service may involve single passenger/passenger group trip and/or multi passenger/passenger group carpooling trips. The optimization result achieved by the disclosed systems and methods are not attainable by existing systems and methods. Currently, a vehicle driver even if provided with a location map of current vehicle services requests would not be able to determine the best move that brings more reward than other choices. The existing systems and methods cannot weigh between waiting and picking up or dropping off passengers, cannot determine which passenger to pick up or drop off, and cannot determine the best route for carpooling trips. Therefore, the disclosed systems and methods at least mitigate or overcome such challenges in providing vehicle service and providing navigation.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
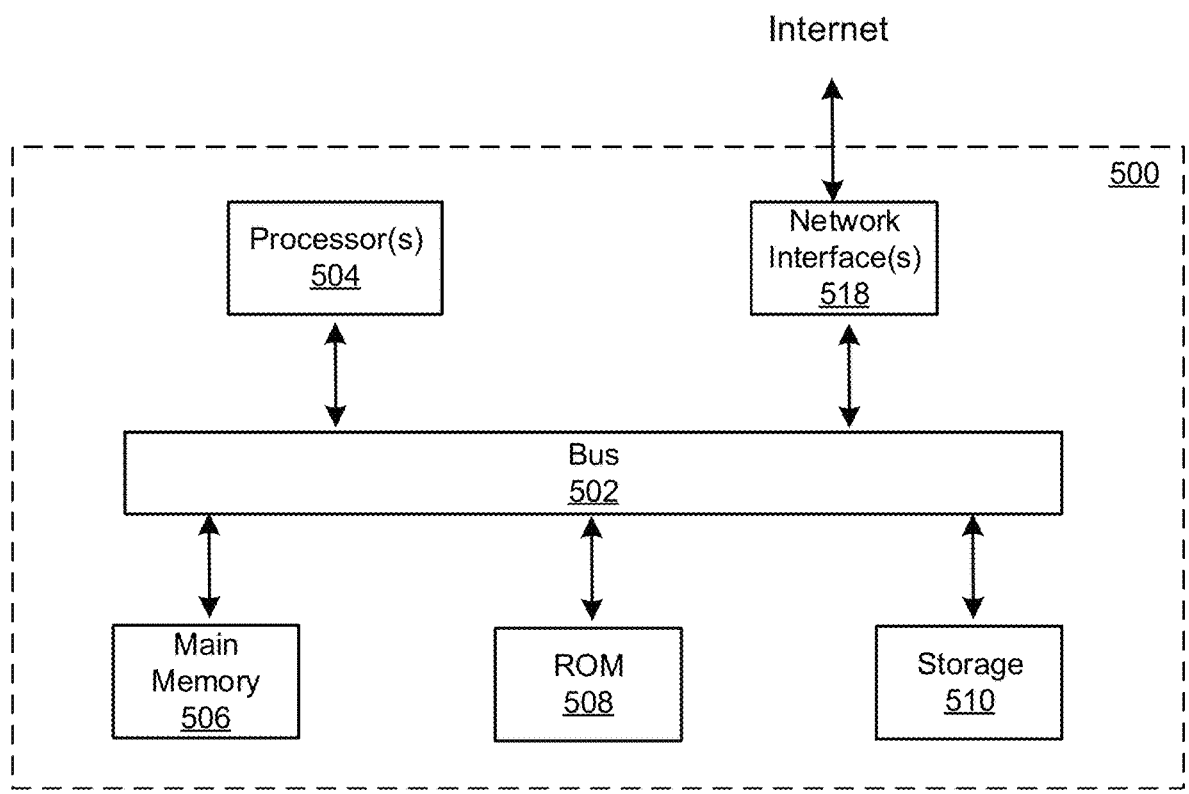
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102a or 102b described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104a or 104b described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106a or 106b described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The Detailed Description is not to be taken in a limiting sense, and the scope of various embodiments is defined only by the appended claims, along with the full range of equivalents to which such claims are entitled.

The invention claimed is:

1. A method for providing vehicle navigation simulation environment, comprising: training a model based on historical trips taken by historical passenger groups to determine a policy that maximizes a cumulative reward for a time period, wherein the trained policy determines a real action for a real vehicle in a real environment, and wherein the training the model further comprises: providing one or more states of a simulation environment to a simulated agent, wherein: the simulated agent comprises a simulated vehicle, and the states comprise a first current time and a first current location of the simulated vehicle; obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, the passenger groups A and B each comprise one or more passengers, and the milestone is an origin or a destination of any passenger group's transportation; determining a reward to the simulated vehicle for the action;
   updating the one or more states based on the action to obtain one or more updated states for providing to the simulated vehicle, wherein the updated states comprise a second current time and a second current location of the simulated vehicle; and
   wherein: if the action is waiting at the current location of the simulated vehicle, the second current time is a current time corresponding to the first current time plus a time segment, and the second current location is the same as the first current location; and if the action is picking up the passenger group A at the origin of the passenger group A's transportation, the second current time is a current time corresponding to picking up the passenger group A and the second current location is the origin of the passenger group A's transportation; and if the action is dropping off the passenger group B at the destination of the passenger group B's transportation, the second current time is a current time corresponding to dropping off the passenger group B and the second current location is the destination of the passenger group B's transportation.

2. The method of claim 1, wherein:
the simulated vehicle performs the action of waiting at the first current location of the simulated vehicle only if the simulated vehicle has no passenger onboard; and
the simulated vehicle only performs the action of dropping off the passenger group B at the destination of passenger group B's when passengers onboard of the simulated vehicle meets a maximum capacity.

3. The method of claim 1, wherein:
the origin of passenger group A's transportation is the closest to the first current location among all origins of all passenger group transportations received as requests by the simulated vehicle by the first current time; and
the destination of the passenger group B's transportation is the closest to the first current location among all destinations of all passenger groups onboard of the simulated vehicle at the first current time.

4. The method of claim 1, wherein determining the reward to the simulated vehicle for the action comprises:
determining the reward to the simulated vehicle for waiting at the first current location of the simulated vehicle to be zero;
determining the reward to the simulated vehicle for picking up the passenger group A at the origin of the passenger group A's transportation to be zero; and
determining the reward to the simulated vehicle for dropping off the passenger group B at the destination of the passenger group B's transportation based on a theoretical travel distance from an origin of the passenger group B's transportation to the destination of the passenger group B's transportation.

5. The method of claim 1, wherein:
the action of picking up the passenger group A at the origin of passenger group A's transportation comprises, when the simulated vehicle has a first passenger group onboard, picking up a second passenger group;
transporting the first and second passenger groups takes the least sum of: a total extra passenger travel time for routing option 1 and a total extra passenger travel time for routing option 2;
the routing option 1 comprises picking up the second passenger group, then dropping of the passenger group P, and then dropping of the second passenger group;
the routing option 2 comprises picking up the second passenger group, then dropping of the second passenger group, and then dropping of the first passenger group;
the total extra passenger travel time for the routing option 1 is a summation of extra time costing the first and second passenger groups when transported by the simulated vehicle following the routing option 1 as compared to being transported one-group-by-one-group without carpool; and the total extra passenger travel time for the routing option 2 is a summation of extra time costing the first and second passenger groups when transported by the simulated vehicle following the routing option 2 as compared to being transported one-group-by-one-group without carpool.

6. The method of claim 5, further comprising:
if the total extra passenger travel time for the routing option 1 is less than the total extra passenger travel time for the routing option 2, assigning the simulated vehicle to follow the routing option 1; and
if the total extra passenger travel time for the routing option 1 is more than the total extra passenger travel time for the routing option 2, assigning the simulated vehicle to follow the routing option 2.

7. The method of claim 1, wherein the action for the real vehicle in the real environment is selected from:
(action 1) waiting at a current location of the real vehicle,
(action 2) picking up a passenger group, and
(action 3) dropping off a passenger group.

8. The method of claim 1, wherein the trained policy further determines an order of dropping passenger groups onboard of the real vehicle, if two or more passenger groups are onboard.

9. A non-transitory computer-readable storage medium storing instructions that, when executed by one or more processors, cause the one or more processors to perform a method for providing vehicle navigation simulation environment, the method comprising: training a model based on historical trips taken by historical passenger groups to determine a policy that maximizes a cumulative reward for a time period, wherein the trained policy determines a real action for a real vehicle in a real environment, and wherein the training the model further comprises: providing one or more states of a simulation environment to a simulated agent, wherein: the simulated agent comprises a simulated vehicle, and the states comprise a first current time and a first current location of the simulated vehicle; obtaining an action by the simulated vehicle when the simulated vehicle has reached a milestone, wherein: the action is selected from: waiting at the first current location of the simulated vehicle, picking up a passenger group A at an origin of passenger group A's transportation, and dropping off a passenger group B at a destination of passenger group B's transportation, the passenger groups A and B each comprise one or more passengers, and the milestone is an origin or a destination of any passenger group's transportation; determining a reward to the simulated vehicle for the action;
updating the one or more states based on the action to obtain one or more updated states for providing to the simulated vehicle, wherein the updated states comprise a second current time and a second current location of the simulated vehicle; and
wherein: if the action is waiting at the current location of the simulated vehicle, the second current time is a current time corresponding to the first current time plus a time segment, and the second current location is the same as the first current location; and if the action is picking up the passenger group A at the origin of the passenger group A's transportation, the second current time is a current time corresponding to picking up the passenger group A and the second current location is the origin of the passenger group A's transportation; and if the action is dropping off the passenger group B at the destination of the passenger group B's transportation, the second current time is a current time corresponding to dropping off the passenger group B and the second current location is the destination of the passenger group B's transportation.

10. The non-transitory computer-readable storage medium of claim 9, wherein:
the simulated vehicle performs the action of waiting at the first current location of the simulated vehicle only if the simulated vehicle has no passenger onboard; and
the simulated vehicle only performs the action of dropping off the passenger group B at the destination of passenger group B's when passengers onboard of the simulated vehicle meets a maximum capacity.

11. The non-transitory computer-readable storage medium of claim 9, wherein:
the origin of passenger group A's transportation is the closest to the first current location among all origins of all passenger group transportations received as requests by the simulated vehicle by the first current time; and
the destination of the passenger group B's transportation is the closest to the first current location among all destinations of all passenger groups onboard of the simulated vehicle at the first current time.

12. The non-transitory computer-readable storage medium of claim 9, wherein determining the reward to the simulated vehicle for the action comprises:
determining the reward to the simulated vehicle for waiting at the first current location of the simulated vehicle to be zero;
determining the reward to the simulated vehicle for picking up the passenger group A at the origin of the passenger group A's transportation to be zero; and
determining the reward to the simulated vehicle for dropping off the passenger group B at the destination of the passenger group B's transportation based on a theoretical travel distance from an origin of the passenger group B's transportation to the destination of the passenger group B's transportation.

13. The non-transitory computer-readable storage medium of claim 9, wherein:
the action of picking up the passenger group A at the origin of passenger group A's transportation comprises, when the simulated vehicle has a first passenger group onboard, picking up a second passenger group;
transporting the first and second passenger groups takes the least sum of: a total extra passenger travel time for routing option 1 and a total extra passenger travel time for routing option 2;
the routing option 1 comprises picking up the second passenger group, then dropping of the passenger group P, and then dropping of the second passenger group;
the routing option 2 comprises picking up the second passenger group, then dropping of the second passenger group, and then dropping of the first passenger group;
the total extra passenger travel time for the routing option 1 is a summation of extra time costing the first and second passenger groups when transported by the simulated vehicle following the routing option 1 as compared to being transported one-group-by-one-group without carpool; and
the total extra passenger travel time for the routing option 2 is a summation of extra time costing the first and second passenger groups when transported by the simulated vehicle following the routing option 2 as compared to being transported one-group-by-one-group without carpool.

14. The non-transitory computer-readable storage medium of claim 13, further comprising:
- if the total extra passenger travel time for the routing option 1 is less than the total extra passenger travel time for the routing option 2, assigning the simulated vehicle to follow the routing option 1; and
- if the total extra passenger travel time for the routing option 1 is more than the total extra passenger travel time for the routing option 2, assigning the simulated vehicle to follow the routing option 2.

15. The non-transitory computer-readable storage medium of claim 9,
- wherein the action for the real vehicle in the real environment is selected from:
  - (action 1) waiting at a current location of the real vehicle,
  - (action 2) picking up a passenger group, and
  - (action 3) dropping off a passenger group.

16. The non-transitory computer-readable storage medium of claim 9, wherein the trained policy further determines an order of dropping passenger groups onboard of the real vehicle, if two or more passenger groups are onboard.

17. A method for providing vehicle navigation, comprising: determining a current location a real vehicle; and in response to determining that the real vehicle has reached a milestone, the milestone being an origin or a destination of a passenger group's transportation, providing an instruction based at least on a policy that maximizes a cumulative reward for the real vehicle, wherein: the policy is determined using a model trained based on historical trips taken by historical passenger groups; the provided instruction comprises: waiting at the current location, picking up a passenger group A at an origin of passenger group A's transportation, or dropping off a passenger group B at a destination of passenger group B's transportation; the passenger groups A and B each comprise one or more passengers; the instruction of picking up the passenger group A at the origin of passenger group A's transportation comprises, when the real vehicle has a first passenger group onboard, picking up a second passenger group; transporting the first and second passenger groups takes the least sum of: a total extra passenger travel time for routing option 1 and a total extra passenger travel time for routing option 2; the routing option 1 comprises picking up the second passenger group, then dropping of the passenger group P, and then dropping of the second passenger group; the routing option 2 comprises picking up the second passenger group, then dropping of the second passenger group, and then dropping of the first passenger group; the total extra passenger travel time for the routing option 1 is a summation of extra time costing the first and second passenger groups when transported by the simulated vehicle following the routing option 1 as compared to being transported one-group-by-one-group without carpool;
- the total extra passenger travel time for the routing option 2 is a summation of extra time costing the first and second passenger groups when transported by the simulated vehicle following the routing option 2 as compared to being transported one-group-by-one-group without carpool; and
- wherein: if the action is waiting at the current location of the simulated vehicle, the second current time is a current time corresponding to the first current time plus a time segment, and the second current location is the same as the first current location; and if the action is picking up the passenger group A at the origin of the passenger group A's transportation, the second current time is a current time corresponding to picking up the passenger group A and the second current location is the origin of the passenger group A's transportation; and if the action is dropping off the passenger group B at the destination of the passenger group B's transportation, the second current time is a current time corresponding to dropping off the passenger group Band the second current location is the destination of the passenger group B's transportation.

18. The method of claim 17, wherein:
- if the total extra passenger travel time for the routing option 1 is less than the total extra passenger travel time for the routing option 2, the instruction comprises following the routing option 1; and
- if the total extra passenger travel time for the routing option 1 is more than the total extra passenger travel time for the routing option 2, the instruction comprises following the routing option 2.

\* \* \* \* \*

UNITED STATES PATENT AND TRADEMARK OFFICE
CERTIFICATE OF CORRECTION

PATENT NO. : 10,989,546 B2  
APPLICATION NO. : 15/970414  
DATED : April 27, 2021  
INVENTOR(S) : Zhiwei Qin, Ishan Jindal and Xuewen Chen Page 1 of 1

It is certified that error appears in the above-identified patent and that said Letters Patent is hereby corrected as shown below:

In the Claims

In Claim 9, Column 20, Line 1, "off the passenger group Band the second current" should read --off the passenger group B and the second current--.

In Claim 17, Column 22, Line 31, "sponding to dropping off the passenger group Band the" should read --sponding to dropping off the passenger group B and the--.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*